UNITED STATES PATENT OFFICE.

CHRISTOPHER H. BIERBAUM, OF BUFFALO, NEW YORK.

METHOD OF MAKING LUBRICANTS.

1,186,167. Specification of Letters Patent. Patented June 6, 1916.

No Drawing. Application filed March 30, 1914. Serial No. 828,170.

*To all whom it may concern:*

Be it known that I, CHRISTOPHER H. BIERBAUM, a citizen of the United States, residing in the city of Buffalo, in the county of Erie, in the State of New York, have invented new and useful Improvements in Methods of Making Lubricants.

The present invention provides a method for combining graphite with lubricating oils in a manner more efficient and economic than that heretofore attained.

My improved method consists in first mixing graphite, in a more or less finely ground state, with a pitch like substance forming a pasty or semi-fluid mass, then grinding this mixture to any desired degree and finally introducing this ground mixture into the lubricating oil.

It is generally known by those skilled in the art, that a certain amount of graphite, in a relatively finely divided state, introduced into lubricating oils, has a decidedly beneficial effect upon the lubricating value of such oils, owing to the fact that the graphite in itself is a very effective lubricant. This addition of graphite is especially valuable under certain conditions, particularly where the pressure on the bearings is severe and intermittent, as it is in machinery having reciprocating parts, such as the service on the crank-pin of an engine, particularly in that part of the stroke at the point of maximum pressure, where the oil film in a large degree is squeezed out and the graphite only is left between the rubbing surfaces. The degree of fineness of the graphite is one of considerable importance, for if the particles are too coarse, the graphite tends to settle out, and is therefore, not properly carried in between the rubbing surfaces of the bearings, where it is required in order to give any beneficial effect. The excessively coarse particles of graphite which have settled out may also tend to clog the oil passages, and thus tend to obstruct the free supply of oil to the bearings. On the other hand, if the particles of graphite are of such a degree of ultimate fineness, that they are readily held in suspension indefinitely for any length of time, then and in that case, the amount of graphite left between the surfaces of a bearing, after the oil-film is squeezed out is such a minute or infinitesimal amount, that it is practically negligible and of little or no lubricating value. The size of the graphite particles, therefore, which are most effective for lubrication are the largest that can be satisfactorily supplied to the bearing and at the same time be actually carried by the oil-film between the bearing surfaces. For maximum efficiency the smoother surfaces should be supplied by the finer particles of graphite, and the rougher and more uneven surfaces by the larger particles; likewise in the latter case, the oil used should be a heavier or more viscous kind and this heavier oil in turn has also the advantage of retaining in suspension larger particles of graphite.

The graphite to be used may be either the amorphous, or the flake, as is now generally supplied in the markets for lubrication purposes. The crude petroleum oil obtained from the oil-fields of Texas, or any other crude oil containing asphaltum, and having preferably a percentage of asphaltum say upward of 10 per cent., offers a very satisfactory material for mixing with the graphite for grinding; if the natural solution of asphaltum cannot be had it may be prepared artificially, by dissolving asphaltum in crude oil. My preferred constituents are Texas crude oil containing substantially 40 per cent. of asphaltum and any grade of pure graphite suitable for lubrication purposes. The graphite, however, should be reduced to a comparatively fine state before being mixed with crude oil. I mix the powdered graphite with the crude oil in the proportion of 10 parts of the former to 13 parts of the latter, then begin grinding the same, and as the mixture thickens during grinding continue to add more and more of the crude oil until this final proportion has been obtained, 10 parts of graphite to 30 parts of crude oil. By using a relatively small amount of crude oil, when first beginning to grind, better results can be obtained, in that a rather thick-paste is necessary in order to produce a fine degree of grinding. If, however, the graphite used is in a fine uniform condition or if a coarse mixture is desired for mixing with a heavy oil or grease, then this grinding operation becomes little or nothing more than a mixing process. In any event the use of the hereinafter mentioned grinding machine is a desirable appliance for preparing this compound. This natural asphaltum crude oil has many physical qualities, that render it especially serviceable for this purpose. In the first place, it has a natural affinity for the graphite to which it adheres tenaciously, herein giving special advantages for the fine grinding of the graphite. This crude oil is also readily soluble in the lubricating oils and mixes freely with the same and with its natural affinity for the graphite, tends to hold it in suspension in a very superior manner. In addition to the foregoing, the tenacious or sticky physical properties of asphaltum when introduced into the lubricating oil, add very materially to the lubricating value of these oils, in that they strengthen the oil-film against being squeezed out by making it more tenacious and increasing its affinity or adhesion to the bearing surfaces.

The grinding may be done on any one of the standard grinding machines now commonly used in the preparation of paints and pigments, the preferred type being the kind having smooth, parallel, cylindrical granite rolls, which are forced together and rotated at a somewhat different rate of speed.

In some cases it is desirable to grade this ground material for different degrees of fineness. This can be done by adding a light volatile liquid like toluol to the ground material as it comes from the grinder, mixing thoroughly, then allowing the diluted material to stand for any desired length of time in order that the heavier particles may settle to the bottom. By taking the upper portion of this diluted mixture and heating the same to drive off the toluol the material is brought back to its original degree of concentration and free from all excessively large particles. A few simple trials will enable anyone familiar with this class of manipulation to produce any desired grade of material. A number of different diluting fluids may be used in place of toluol, in fact any liquid that is thoroughly miscible with oil and asphaltum such as chloroform, gasolene and the like. These different diluting fluids, for economy sake, may then be recovered by distillation and condensation in any one of the many usual and well known forms now in use for that purpose.

It will be obvious to those skilled in the art, to which this invention appertains, that modifications of the same may be made in details without departing from the spirit hereof; hence, I do not limit myself to the precise mode of procedure hereinabove set forth, but

Having thus described the nature and objects of my invention, what I claim as new and desire to secure by Letters Patent is:

1. The herein described method of making a lubricant, which consists in mixing graphite with asphaltum and diluting the mixture with lubricating oil.

2. The herein described method of making a lubricant, which consists in grinding graphite in a solution of asphaltum and diluting the resulting compound with lubricating oil.

3. The herein described method of making a lubricant, which consists in grinding graphite in a dilute solution of asphaltum and diluting the resulting compound with lubricating oil.

4. The herein described method of making a lubricant, which consists in grinding graphite in a solution of asphaltum, and diluting the resulting mixture with a lubricating oil.

5. The herein described method of making a lubricant, which consists in grinding graphite, mixing the ground product with a miscible fluid, and after sedimentation and decanting, driving off the miscible fluid from the decanted portion.

6. The herein described method of making a lubricant, which consists in grinding graphite in a solution of asphaltum, mixing the ground product with a miscible fluid and after sedimentation and decanting, driving off the miscible fluid, and diluting this final product with lubricating oil.

CHRISTOPHER H. BIERBAUM.

Witnesses:
CLARA M. STREETS,
C. G. BABCOCK.